(12) United States Patent
Bang et al.

(10) Patent No.: US 9,484,851 B2
(45) Date of Patent: Nov. 1, 2016

(54) TECHNIQUE FOR CORRECTING RESOLVER OFFSET

(71) Applicant: Hyundai Motor Company, Seoul (KR)

(72) Inventors: Jae Sung Bang, Gyeonggi-do (KR); Yong Seok Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 892 days.

(21) Appl. No.: 13/651,700

(22) Filed: Oct. 15, 2012

(65) Prior Publication Data
US 2013/0275069 A1 Oct. 17, 2013

(30) Foreign Application Priority Data
Apr. 13, 2012 (KR) .................. 10-2012-0038205

(51) Int. Cl.
*H02P 21/14* (2016.01)
*B60L 11/12* (2006.01)
(Continued)

(52) U.S. Cl.
CPC .............. *H02P 21/14* (2013.01); *B60L 11/123* (2013.01); *B60L 11/14* (2013.01); *B60L 11/1887* (2013.01); *B60L 15/025* (2013.01); *B60L 15/20* (2013.01); *B60L 2200/10* (2013.01); *B60L 2200/18* (2013.01); *B60L 2200/32* (2013.01); *B60L 2200/36* (2013.01); *B60L 2220/14* (2013.01); *B60L 2240/421* (2013.01); *B60L 2240/423* (2013.01); *B60L 2240/429* (2013.01); *B60L 2240/441* (2013.01); *B60L 2240/443* (2013.01); *Y02T 10/6217* (2013.01);

(Continued)

(58) Field of Classification Search
CPC ... B62D 5/046; B62D 5/0481; B06L 15/025; B06L 11/00; B06L 11/14; H02P 21/22; H02P 21/18; H02P 21/16; B60L 11/123
USPC ............ 180/54.1, 65.1; 318/16, 400.02, 807, 318/799, 432, 400.04; 701/1, 22, 32.8, 42; 702/1, 85, 115
See application file for complete search history.

(56) References Cited

U.S. PATENT DOCUMENTS 6,608,456 B2 * 8/2003 Imai et al. ............... 318/400.02
6,927,551 B2 * 8/2005 Yoshimoto ................ 318/715
(Continued)

FOREIGN PATENT DOCUMENTS

JP 2001-008486 A 1/2001
JP 2007228700 A 9/2007
(Continued)

*Primary Examiner* — Toan Le
*Assistant Examiner* — Jeffrey Aiello
(74) *Attorney, Agent, or Firm* — Mintz Levin Cohn Ferris Glovsky and Popeo, P.C.; Peter F. Corless (57) ABSTRACT

Disclosed is a technique of correcting a resolver offset by measuring and correcting an offset of a resolver assembled to a motor of an eco-friendly vehicle in an accurate and simple way. The offset measurement process includes, after completing the assembly of a resolver a resolver to a motor, rotating the motor by using a rotation device able to transfer a rotation force to the motor, setting a voltage instruction and current-controlling the motor according to the voltage instruction, and obtaining a d-axis current and a q-axis current, which are feedback currents, during the current-control of the motor. Then when the system is in a steady state, a resolver offset ($\tilde{\theta}$) is calculated from the d-axis current and the q-axis current by using $\tilde{\theta}=\tan^{-1}$(d-axis current/q-axis current).

12 Claims, 3 Drawing Sheets

(51) Int. Cl.
    *B60L 11/14*          (2006.01)
    *B60L 11/18*          (2006.01)
    *B60L 15/02*          (2006.01)
    *B60L 15/20*          (2006.01)

(52) U.S. Cl.
    CPC .......... *Y02T 10/643* (2013.01); *Y02T 10/7077* (2013.01); *Y02T 10/72* (2013.01); *Y02T 10/7275* (2013.01); *Y02T 90/34* (2013.01)

(56) References Cited

U.S. PATENT DOCUMENTS

| | | | |
|---|---|---|---|
| 7,830,106 B2* | 11/2010 | Fukuchi | H02P 21/0035 318/400.02 |
| 7,960,940 B2* | 6/2011 | Kariatsumari | H02P 21/0035 318/400.01 |
| 8,080,957 B2* | 12/2011 | Miura | B62D 5/046 318/400.01 |
| 8,686,672 B2* | 4/2014 | Suzuki | 318/400.02 |
| 2004/0178764 A1* | 9/2004 | Kaku et al. | 318/716 |
| 2005/0060076 A1* | 3/2005 | Phillips et al. | 701/51 |
| 2005/0060080 A1* | 3/2005 | Phillips et al. | 701/54 |
| 2005/0104551 A1* | 5/2005 | Nishimura et al. | 318/719 |
| 2008/0272731 A1* | 11/2008 | Schulz | H02P 21/06 318/807 |
| 2011/0031912 A1* | 2/2011 | Hong | H02P 6/10 318/400.04 |
| 2012/0302396 A1* | 11/2012 | Park et al. | 477/5 |
| 2014/0285125 A1* | 9/2014 | Kato | 318/400.02 |
| 2014/0346983 A1* | 11/2014 | Kato | 318/400.02 |

FOREIGN PATENT DOCUMENTS

| | | |
|---|---|---|
| JP | 2010-148271 A | 7/2010 |
| JP | 2010-148324 A | 7/2010 |
| JP | 2011135641 A | 7/2011 |
| KR | 100851141 B1 | 8/2008 |
| KR | 10-2011-0048979 | 5/2011 |

* cited by examiner

TECHNIQUE FOR CORRECTING RESOLVER OFFSET

CROSS-REFERENCE TO RELATED APPLICATION

This application claims under 35 U.S.C. §119(a) the benefit of Korean Patent Application No. 10-2012-0038205 filed Apr. 13, 2012, the entire contents of which are incorporated herein by reference.

BACKGROUND (a) Technical Field

The present invention relates to a technique of correcting a resolver offset. More particularly, the present invention relates to a technique of correcting a resolver offset, in which a resolver offset used for motor control in eco-friendly vehicles such as hybrid vehicles and so forth can be measured and corrected simply.

(b) Background Art

Today, due to high oil prices and $CO_2$ restrictions, research has been continuously carried out on eco-friendly vehicles, such as hybrid vehicles, pure electric vehicles, fuel cell vehicles, etc., which are capable of replacing conventional internal-combustion engine vehicles. These eco-friendly vehicles typically use an electric motor (traction motor) as a drive source. For the most part, a permanent-magnet synchronous motor having high power and high efficiency is typically used as the traction motor, e.g., a built-in permanent-magnet synchronous motor.

Eco-friendly vehicles also have mounted thereon an inverter system for motor control, and use a resolver for detecting an absolute angular position θ of a motor's rotator used for motor control. It is well known that the resolver is mounted on an integrated starter & generator (ISG) of a hybrid vehicle, as well as the traction motor.

Figure 1:
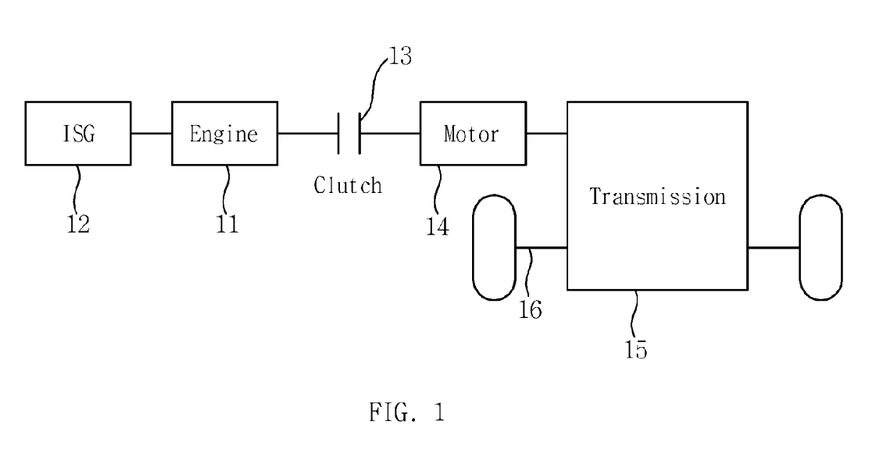
FIG. 1 is a schematic diagram of a conventional drive system of a hybrid vehicle.

FIG. 1 is a schematic diagram of a drive system of a hybrid vehicle. As shown in FIG. 1, the hybrid vehicle has a layout in which an engine 11, which is a drive source, a traction motor 14, and a transmission 15 between the traction motor 14 and a drive shaft 16 are arranged in a line. The traction motor 14 and the transmission 15 are serially connected to each other, and the engine 11 and the traction motor 14 are connected to each other with a clutch 13 interposed therebetween for power transfer, such that power transfer can be controlled according to the state of the clutch 13.

In addition, a motor for providing a rotational force (outputting a cranking torque) to the engine 11 during starting, that is, an ISG 12 is connected to the engine 11. In this structure, when the clutch 13 is disengaged, then the drive shaft 16 of the vehicle is driven only by the traction motor 14. When the clutch 13 is engaged, then the drive shaft 16 may be driven by the engine 11 and the traction motor 14.

When the clutch 13 is locked, the ISG 12 and the traction motor 14 may be rotated by the torque of the engine 11, and in this case, the engine 11, the ISG 12, and the traction motor 14 all rotate at the same speed. In this case, the ISG 12 and the traction motor 14 act as the load of the engine 11, such that a counter electromotive force is generated in the ISG 12 and the traction motor 14 and they operate as a power generator for charging the battery.

In the last stage of a vehicle production line, a rotator position offset of the traction motor and the ISG (i.e., a difference between the position of the rotator of the motor and the position of the rotator of the resolver) while the clutch is engaged and the engine is idling has to be measured and stored in a motor control unit (MCU). By doing so, the MCU may correct a resolver's output signal by the measured offset and thus, the accurate position of the rotator of the motor can be reflected in motor control.

The resolver, as mentioned previously, is used to measure the absolute angular position θ of the motor's rotator used for motor control with respect to a motor's stator, and in initial assembly of the motor and the resolver, the rotator position offset between the motor and the resolver is inevitable for several reasons such as assembly tolerance between the motor and resolver, the inaccuracy of the position of an internal coil of the resolver, etc.

Eventually, without correcting the resolver's output signal by the offset, reflection of the accurate rotator's position during motor control is impossible. For this reason, when assembly between the motor and the resolver is completed in the production process, the offset has to be measured and stored to accurately correct the output signal of the resolver.

When the ISG or the traction motor is replaced due to failure or when the MCU in which the offset for the resolver is stored is replaced, a resolver position offset for the traction motor or the ISG has to be re-measured and re-stored in the MCU again for accurate offset correction. In this case, measurement and storage of the resolver offset are mainly performed in a service center rather than in a vehicle production stage, and thus due to human error, the resolver offset may not be re-measured after replacement. Thus, unless the resolver offset is re-measured, the resolver offset has to be before starting the vehicle after replacement. In addition, since the resolver offset has to be measured during starting, the measurement of the offset should be performed fairly quickly.

However, in a conventional method which controls the current to 0 through PI control after starting of the engine and then measures the resolver offset, the motor's current dynamics are a time varying system. Thus, it is difficult to ensure that the current is accurately controlled to 0 through PI control and due to a change in the speed of the engine, the offset measurement value may not be correct. Furthermore, a conventional method which measures the resolver position offset without starting of the engine is a complex process and thus requires a lot of time to execute, degrading the efficiency of vehicle production.

SUMMARY OF THE DISCLOSURE

The present invention has been made in an effort to solve the above-described problems associated with prior art, and provides a technique of accurately and simply measuring and correcting an offset of a resolver assembled on a motor (i.e., a traction motor/ISG having the resolver mounted thereon) of an eco-friendly vehicle, such as a hybrid vehicle.

In one aspect, the present invention provides a technique for correcting a resolver offset, the method including an offset measurement process. The offset measurement process includes, after completing the assembly of a resolver to a motor, rotating the motor by using a rotation device capable of transferring a rotational force to the motor, setting a voltage instruction and current-controlling the motor according to the voltage instruction, obtaining a d-axis current and a q-axis current, which are feedback currents, during the current-control of the motor, checking when a state is a steady state in which the d-axis current and the q-axis current are constant within a set range, and when it is determined that the state is the normal state, calculating a resolver offset ($\tilde{\theta}$) from the d-axis current and the q-axis current by using $\tilde{\theta}=\tan^{-1}$(d-axis current/q-axis current).

In an exemplary embodiment, after the d-axis current and the q-axis current are obtained when motor is rotated by a rotation device, the voltage instruction is calculated from the obtained d-axis current and q-axis current based on the equations below:

$$V_d = -\omega(L_1+L_2)i_q - Ki_d$$

$$V_q = \omega(L_1+L_2)i_d - Ki_q \quad \text{(E1)},$$

wherein $V_d$ represents a d-axis voltage instruction, $V_q$ represents a q-axis voltage instruction, $\omega$ represents a motor rotator angular velocity, $L_1$ and $L_2$ represent inductance constants, $i_d$ represents a d-axis current, $i_q$ represents a q-axis current, and K represents a control constant.

In another preferred embodiment, in the calculating of the resolver offset ($\tilde{\theta}$) the d-axis current and the q-axis current are an average value of d-axis currents ($i_d$) and an average value of q-axis currents ($i_q$) obtained at set sampling time intervals, and the resolver offset ($\tilde{\theta}$) is calculated by an equation:

$$\tilde{\theta} = -\tan^{-1}\left(\frac{\overline{i_d}}{\overline{i_q}}\right), \quad \text{(E2)}$$

wherein $\overline{i_d}$ represents an average value for the d-axis current and $\overline{i_q}$ represents an average value for the q-axis current.

Other aspects and preferred embodiments of the invention are discussed infra.

BRIEF DESCRIPTION OF THE DRAWINGS

The above and other features of the present invention will now be described in detail with reference to a certain exemplary embodiment thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings to allow those of ordinary skill in the art to easily carry out the present invention. While the invention will be described in conjunction with the exemplary embodiment, it will be understood that present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network. Additionally, although the exemplary embodiment is described as using one control unit to perform the above process, it is understood that the above processes may also be performed by a plurality of control units, controllers, processors or the like.

The present invention relates to a technique of measuring and correcting a resolver offset of an eco-friendly vehicle that can be usefully applied especially to a hybrid vehicle having mounted thereon an in-vehicle rotating device capable of forcedly driving a motor, that is, an engine. This method can also more accurately and simply measure and correct an offset between a traction motor of the hybrid vehicle and a resolver assembled to an integrated starter and generator (ISG) (e.g., a difference between a position of a rotator of the motor and a position of a rotator of the resolver).

In the present invention, as will be described below, forced rotation of a motor is required in an offset measurement process. For a hybrid vehicle, a traction motor having a resolver mounted thereon and an ISG may be rotated using an engine, such that since the ISG is serially connected to the engine, the ISG may be rotated merely by starting the engine and the traction motor may be rotated by starting the engine while the clutch is engaged.

When, for motor rotation, a separate device is provided or the vehicle is configured to connect a motor rotating shaft to a forced-rotation device (e.g., an external engine, a motor, or the like) separately provided outside of the vehicle in a vehicle production factory, the present invention can be applied to position offset measurement after assembly for a traction motor and a resolver of an electric vehicle, a fuel-cell vehicle, or the like.

Figure 2:
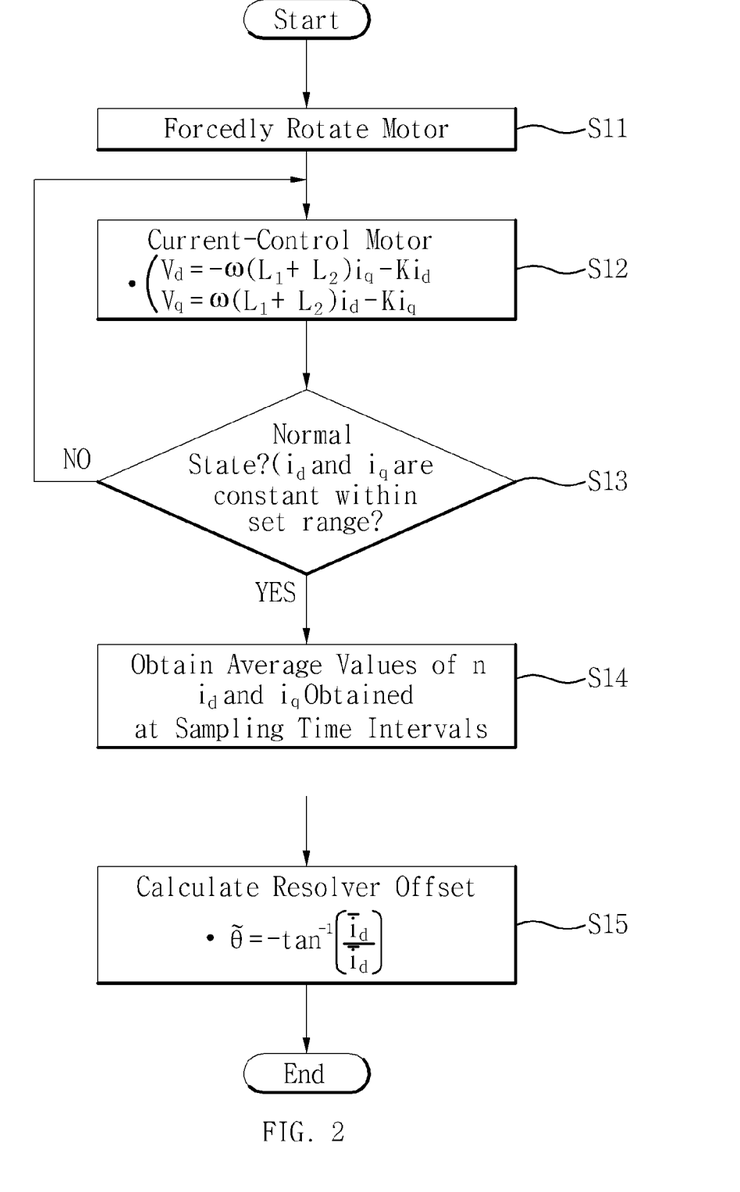
FIG. 2 is a flowchart of a resolver offset method according to an exemplary embodiment of the present invention.
Figure 3:
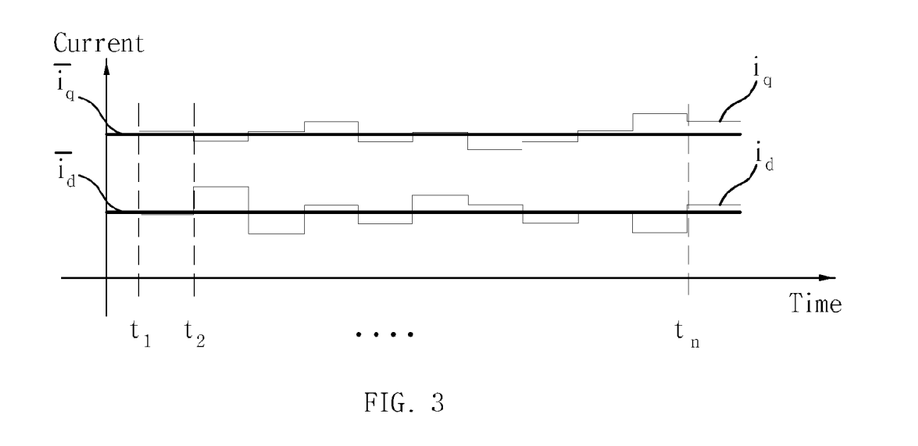
FIG. 3 is a diagram for describing that average values of d-axis current and q-axis current are used in a process of measuring a resolver offset according to the exemplary embodiment of the present invention.

FIG. 2 is a flowchart of a resolver offset method according to an exemplary embodiment of the present invention, and FIG. 3 is a diagram for describing that average values of d-axis current and q-axis current are used in a process of measuring a resolver offset according to the exemplary embodiment of the present invention. Prior to description of the present invention, theoretical description will be first made below.

When a motor is rotated by a rotation device, a voltage instruction is determined by Equation 1, Equation 2, and Equation 3, in which a dq-axis current ($i_d$, $i_q$) used in a dq-axis voltage instruction ($V_d$, $V_q$) of Equation 1 is obtained from a 3-phase current ($i_a$, $i_b$, $i_c$) of an abc-axis, which is actually measured by a current sensor, by using Equation 2, and a 3-phase voltage instruction ($V_a$, $V_b$, $V_c$) of the abc-axis can be obtained using Equation 3.

$$V_d = -\omega(L_1+L_2)i_q - Ki_d$$

$$V_q = \omega(L_1+L_2)i_d - Ki_q \quad (1),$$

wherein $\omega$ represents an angular velocity of a rotator of a motor, $L_1$ and $L_2$ represent inductance constants, K represents a control constant, and $K > \sqrt{2}\max\{\omega L_2\}$.

$$\begin{bmatrix} i_d \\ i_q \end{bmatrix} = \frac{2}{3}\begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & \sin\left(\theta + \frac{2}{3}\pi\right) \end{bmatrix}\begin{bmatrix} i_a \\ i_b \\ i_c \end{bmatrix}, \quad (2)$$

$$\begin{bmatrix} V_a \\ V_b \\ V_c \end{bmatrix} = \frac{2}{3}\begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & \sin\left(\theta + \frac{2}{3}\pi\right) \\ \frac{1}{\sqrt{2}} & \frac{1}{\sqrt{2}} & \frac{1}{\sqrt{2}} \end{bmatrix}^{-1}\begin{bmatrix} V_d \\ V_q \\ 0 \end{bmatrix}, \quad (3)$$

wherein $\theta$ represents an absolute angular position of the motor's rotator, which is measured by a resolver before correction of a resolver offset. That is, $\theta$ includes the resolver offset $\tilde{\theta}$. From an abc-axis (3-phase) voltage differential equation for the motor and Equations 1 and 2, a dq-axis voltage differential equation can be obtained as below.

$$\begin{bmatrix} V_d \\ V_q \end{bmatrix} = \begin{bmatrix} R + \omega L_2 \sin 2\tilde{\theta} & -\omega(L_1 + L_2 \cos 2\tilde{\theta}) \\ \omega(L_1 - L_2 \cos 2\tilde{\theta}) & R - \omega L_2 \sin 2\tilde{\theta} \end{bmatrix} \quad (4)$$

$$\begin{bmatrix} i_d \\ i_q \end{bmatrix} + \begin{bmatrix} -\omega\phi_f \sin\tilde{\theta} \\ \omega\phi_f \cos\tilde{\theta} \end{bmatrix} + \begin{bmatrix} L_1 - L_2 \cos 2\tilde{\theta} & -L_2 \sin 2\tilde{\theta} \\ -L_2 \sin 2\tilde{\theta} & L_1 + L_2 \cos 2\tilde{\theta} \end{bmatrix}\frac{d}{dt}\begin{bmatrix} i_d \\ i_q \end{bmatrix},$$

wherein R, $L_1$, $L_2$, and $\phi_f$ represent a resistance of a motor, inductance constants, and a size of a magnetic flux, respectively, and $i_d$, $i_q$, $V_d$, $V_q$, and $\omega$ represent a d-axis current, a q-axis current, a d-axis voltage, a q-axis voltage, and the angular velocity of the motor's rotator (i.e., obtained from a resolver detection signal), respectively. $\tilde{\theta}$ represents the resolver offset to be measured in the present invention, and the angular velocity $\omega$ of the motor's rotator, because of being a differentiated value of the rotator's position $\theta$, does not include an error.

By multiplying $\cos\tilde{\theta}$ to the first row of Equation 1 and $\sin\tilde{\theta}$ to the second row and then adding the multiplication results, Equation 5 can be obtained as below.

$$V_d \cos\tilde{\theta} + V_q \sin\tilde{\theta} = (L_1 - L_2)\left(\frac{di_d}{dt}\cos\tilde{\theta} + \frac{di_q}{dt}\sin\tilde{\theta}\right) + \quad (5)$$

$$R(i_d \cos\tilde{\theta} + i_q \sin\tilde{\theta}) + \omega(L_1 + L_2)i_d \sin\tilde{\theta} - \omega(L_1 + L_2)i_q \cos\tilde{\theta},$$

wherein $i_d \cos\tilde{\theta} + i_q \sin\tilde{\theta}$ is defined as x as below.

$$x = (i_d \cos\tilde{\theta} + i_q \sin\tilde{\theta}) \quad (6)$$

From Equations 5 and 6, Equation 7 can be obtained as below.

$$(L_1 - L_2)\dot{x} = -Rx - \omega(L_1+L_2)i_d \sin\tilde{\theta} + \omega(L_1+L_2)i_q \cos\tilde{\theta} + V_d \cos\tilde{\theta} + V_q \sin\tilde{\theta} \quad (7)$$

When the current is controlled as in Equation 1, then Equation 8 can be obtained by substituting Equation 1 for Equation 7.

$$\dot{x} = -\frac{(R+K)}{(L_1 - L_2)}x =: -Ax, \quad (8)$$

wherein $A > 0$ because $L_1 > L_2$, such that ($i_d \cos\tilde{\theta} + i_q \sin\tilde{\theta}) \to 0$ as $t \to \infty$.

Thus, conditions as in Equation 9 are satisfied.

$$i_d \cos\tilde{\theta} + i_q \sin\tilde{\theta} \to 0 \text{ as } t \to \infty, |i_d|, |i_q| < \infty \text{ for all time} \quad (9)$$

In Equation 9, an equation in the top line has already been demonstrated, and by demonstrating that absolute values of $i_d$ and $i_q$ are bounded, the demonstration of Equation 9 is completed. To demonstrate that the absolute values of $i_d$ and $i_q$ are bounded, a Lyapunov function is selected as below.

$$V = \frac{1}{2}[i_d, i_q]M[i_d, i_q]^T \quad (10)$$

$$\text{Here, } M = \begin{bmatrix} L_1 - L_2 \cos 2\tilde{\theta} & -L_2 \sin 2\tilde{\theta} \\ -L_2 \sin 2\tilde{\theta} & L_1 + L_2 \cos 2\tilde{\theta} \end{bmatrix},$$

wherein M represents a positive definite matrix.

Eventually, Equation 10 can be re-written as Equation 11 by being differentiated with respect to time, and it can be seen from Equation 11 that a state variable x (see Equation 6) of the system is ultimately bounded, such that the absolute values of $i_d$ and $i_q$ are bounded above as can be seen in Equation 9.

$$\dot{V} \leq -(K+R-\sqrt{2}L_2\omega)\|[i_d i_q]\|^2 + \omega\phi_f\|[i_d i_q]\| \quad (11)$$

where K is selected to satisfy $$K > \sqrt{2} \max_t \{L_2\omega\},$$

and since $\omega$ coincides with an engine rotation velocity and the engine is driven within a predetermined range K can be selected without any trouble.

After the resolver is assembled to the motor, a difference between the motor rotator position and the resolver rotator position, i.e., a resolver offset is measured and stored in the MCU, after which in motor control, a position measurement value obtained from a resolver output signal is corrected by the offset stored in the MCU to use correct position information (i.e., absolute angular position information of the motor's rotator) for motor control (such as rotating speed feedback control, current feedback control, etc.). A detailed description will now be made of an offset measurement process according to the present invention.

Referring to FIG. 2, after the resolver is assembled, the motor (a traction motor or an ISG) to which the resolver is assembled has to be forcedly rotated at a predetermined speed by means of a rotation device for measurement of the resolver offset in step S11. In a hybrid vehicle, the rotation device is an engine capable of transferring a rotation power to the motor.

That is, in the hybrid vehicle, the engine is started in the locked state of the clutch and is driven in an idle state, and in this case, because the clutch is in the locked state, the traction motor and the ISG to which a rotation torque of the engine is transferred are also rotated as in power generation.

In this state, a voltage instruction for the motor's current control is set, such that the motor is current-controlled according to the voltage instruction (e.g., a 3-phase current applied to the motor is controlled according to the voltage instruction) in step S12, and by using a d-axis current $i_d$ and a q-axis current $i_q$ newly obtained in the motor's current-controlled state, the resolver position offset can be obtained. That is, after a sufficient time elapses from Equation 9, a relation such as Equation 12 can be obtained, and eventually, the resolver offset can be defined as Equation 13, such that by obtaining the d-axis current $i_d$ and the q-axis current $i_q$ from the resolver's output signal (e.g., position detection signal) in the motor's current-controlled state according to the voltage instruction, the resolver offset $\tilde{\theta}$ can be obtained by Equation 13.

$$i_d \cos\tilde{\theta} + i_q \sin\tilde{\theta} = 0 \quad (12)$$

$$\tilde{\theta} = -\tan^{-1}\left(\frac{i_d}{i_q}\right) \quad (13)$$

In the motor's current control process, the voltage instruction is calculated by using the d-axis current and the q-axis current obtained from the resolver's output signal, and at this time, the abc-axis current ($i_a$, $i_b$, $i_c$) is measured from the current sensor and by using Equation 2, a dq-axis current ($i_d$, $i_q$) can be obtained from the abc-axis current ($i_a$, $i_b$, $i_c$).

In addition, from the dq-axis current ($i_d$, $i_q$), a dq-axis voltage instruction ($V_d$, $V_q$) is obtained. To convert the dq-axis voltage instruction into an abc-axis 3-phase voltage instruction, the abc-axis 3-phase voltage instruction ($V_a$, $V_b$, $V_c$) obtained from Equation 3 is used for control. Therefore, when a relation of conversion matrices such as Equation 2 and Equation 3 exists, the current control is carried out through the voltage instruction such as Equation 1 and after the elapse of a sufficient time therefrom, the resolver offset $\tilde{\theta}$ can be obtained from a result of Equation 12 by using Equation 13.

The d-axis current and the q-axis current, which are motor control feedback currents, are calculated based on the resolver's output signal (e.g., position detection signal) and the current sensor's output signal for detection of the motor's 3-phase current. It is well understood that the d-axis current and the q-axis current (i.e., motor control state feedback current, i.e., d-axis and q-axis feedback currents) are calculated using Equation 2.

In brief, the absolute angular position θ of the motor's rotator is detected by the resolver assembled to the motor, and the phase current ($i_a$, $i_b$, $i_c$) is detected by the current sensor mounted on the motor. In typical motor control, a 3-phase/d-q coordinate converter converts the phase current ($i_a$, $i_b$, $i_c$) detected by the current sensor into the d-axis current ($i_d$) (i.e., a magnetic-flux current) and a d-axis current ($i_q$) (i.e., a torque current) by using position information detected by the resolver, and the obtained d-axis current and q-axis current are used as feedback currents for generating a rotation speed instruction, a torque instruction, a voltage instruction, etc., for motor control.

In the present invention, in the motor's forced driving state after the resolver is assembled, the d-axis current ($i_d$) and the q-axis current ($i_q$) are obtained from the detection signals of the resolver and the current sensor, and then the voltage instruction ($V_d$, $V_q$) of Equation 1 according to the motor specifications is calculated from the obtained d-axis current ($i_d$) and q-axis current ($i_q$), after which the motor is current-controlled based on the calculated voltage instruction (in step S12 of FIG. 2).

The motor's current control is executed according to the calculated d-axis and q-axis voltage instruction includes a process of coordinate-converting the d-axis and q-axis voltage instruction into the 3-phase (a, b, c) voltage instruction by using the absolute angular position of the motor's rotator detected by the resolver, at the 3-phase/d-q coordinate converter (executed using Equation 2) and a process of controlling a 3-phase current applied to the motor according to the 3-phase voltage instruction.

The process of controlling the 3-phase current according to the 3-phase voltage instruction may include a process in which the 3-phase voltage instruction is input to a space vector pulse width modulation algorithm module to generate a duty ($D_u$, $D_v$, $D_w$) for a switch control signal, and a PWM inverter controls the 3-phase current applied to a permanent magnet synchronous motor based on the duty. The coordinate conversion process of the coordinate converter and the duty generation and 3-phase current control process using space vector pulse width modulation are well understood and thus will not be described in detail.

Meanwhile, in the motor's current controlled state, it is checked when the state is a state in which the d-axis current ($i_d$) and the q-axis current ($i_q$) obtained from the output signal of the resolver and the output signal of the current sensor are almost constant within a set range during a set time, that is, a normal state in which the d-axis current and the q-axis current do not change by a large amount within the range in step S13; when the state is the normal state in which the d-axis current and the q-axis current do not change, then the resolver offset $\tilde{\theta}$ is calculated from Equation 13 by using the d-axis current ($i_d$) and the q-axis current ($i_q$) (in steps 14 and 15).

There may be an influence of noise in measurement of the d-axis current and the q-axis current, so that in calculation of an offset, the influence of the noise needs to be minimized. To this end, when the resolver offset $\tilde{\theta}$ is calculated from Equation 13 by using the d-axis current ($i_d$) and the q-axis current ($i_q$) it is desirable to use average values ($\overline{i_d}, \overline{i_q}$) of the d-axis current ($i_d$) and the q-axis current ($i_q$), which are obtained at preset sampling time intervals. That is, due to sensor noise from the resolver and the current sensor, the d-axis current ($i_d$) and the q-axis current ($i_q$) obtained at predetermined time intervals may be values which vary with time as shown in FIG. 3. To minimize the influence of the noise, average values of a predetermined number of the d-axis current ($i_d$) and the q-axis current ($i_q$) obtained at predetermined time intervals are obtained and used.

When an average value of d-axis currents and an average value of q-axis currents obtained at multiple (n) sample times are $\bar{i}_d$ and $\bar{i}_q$, respectively, they may be expressed as below.

$$\bar{i}_d = \frac{1}{n}\sum_{k=1}^{n} i_d(t_k) \quad (14)$$

$$\bar{i}_q = \frac{1}{n}\sum_{k=1}^{n} i_d(t_k)$$

When the average values are used, Equation 13 for offset calculation can be expressed as in Equation 15, and from the average value $\bar{i}_d$ for the d-axis current and the average value $\bar{i}_q$ for the q-axis current, the resolver offset $\tilde{\theta}$ can be obtained using Equation 15 (in step S15 of FIG. 2).

$$\tilde{\theta} = -\tan^{-1}\left(\frac{\bar{i}_d}{\bar{i}_q}\right) \quad (15)$$

Once the resolver offset $\tilde{\theta}$ is obtained and stored, the rotator absolute angular position θ detected by the resolver is corrected using the offset during motor control, such that accurate motor control from which the resolver offset is removed becomes possible.

Advantageously, resolver offset measurement and correction can be performed through a simple process of initial motor forced driving after resolver assembly, motor current control based on Equation 1, offset calculation from measurement values of d-axis current and q-axis current obtained in the motor's current-controlled state, and correction of the resolver detection value with the calculated offset. Thus, when compared to a conventional method, a resolver offset measurement time can be remarkably reduced and the accuracy of a resolver offset measurement value in the conventional method (PI control logic) due to a change in the engine speed can be effectively solved.

Therefore, with the technique of correcting the resolver offset according to the present invention, resolver offset measurement and correction can be performed through a simple process of initial motor forced driving after resolver assembly, motor current control based on Equation 1, offset calculation through calculation of d-axis current and q-axis current from a-axis, b-axis, and c-axis current values measured in the motor's current-controlled state, and correction of the resolver detection value with the calculated offset. Thus, when compared to a conventional method, a resolver offset measurement time can be remarkably reduced and the accuracy of a resolver offset measurement value in the conventional method (PI control logic) due to a change in the engine speed can be effectively solved.

While an exemplary embodiment of the present invention has been described in detail, the protection scope of the present invention is not limited to the foregoing embodiment and it will be appreciated by those skilled in the art that various modifications and improvements using the basic concept of the present invention defined in the appended claims are also included in the protection scope of the present invention.

What is claimed is:

1. A method of correcting a resolver offset comprising an offset measurement process,
    wherein the offset measurement process comprises:
        after completing the assembly of a resolver to a motor, rotating the motor by using a rotation device capable of transferring a rotation force to the motor;
        setting, by the controller, a voltage instruction and current-controlling the motor according to the voltage instruction;
        obtaining, by a controller, a d-axis current and a q-axis current, which are feedback currents, during the current-control of the motor;
        determining, by the controller, when a state is a steady state in which the d-axis current and the q-axis current are constant within a set range; and
        when it is determined that the state is the normal state, calculating, by the controller, a resolver offset ($\tilde{\theta}$) from the d-axis current and the q-axis current by using $\tilde{\theta}=\tan^{-}$(d-axis current/q-axis current),
    wherein after the d-axis current and the q-axis current are obtained in a state where the motor is rotated by a rotation device, the voltage instruction is calculated from the obtained d-axis current and q-axis current based on the following equations:

$$V_d = -\omega(L_1+L_2)i_q - Ki_d$$

$$V_q = \omega(L_1+L_2)i_d - Ki_q \quad (E1),$$

wherein $V_d$ represents a d-axis voltage instruction, $V_q$ represents a q-axis voltage instruction, ω represents a motor rotator angular velocity, $L_1$ and $L_2$ represent inductance constants, $i_d$ represents a d-axis current, $i_q$ represents a q-axis current, and K represents a control constant.

2. The method of claim 1, wherein in the calculating of the resolver offset ($\tilde{\theta}$), the d-axis current and the q-axis current are an average value of d-axis currents ($i_d$) and an average value of q-axis currents ($i_q$) obtained at set sampling time intervals, and the resolver offset ($\tilde{\theta}$) is calculated by:

$$\tilde{\theta} = -\tan^{-1}\left(\frac{\bar{i}_d}{\bar{i}_q}\right), \quad (E2)$$

wherein $\bar{i}_d$ represents an average value for the d-axis current and $\bar{i}_q$ represents an average value for the q-axis current.

3. The method of claim 1, wherein the d-axis current and the q-axis current are obtained by performing coordinate-conversion on current on the motor measured by a current sensor using a resolver detection value.

4. The method of claim 1, wherein the motor is a traction motor for vehicle driving.

5. The method of claim 1, wherein in a hybrid vehicle, the motor is an integrated starter and generator (ISG).

6. A non-transitory computer readable medium containing program instructions executed by a processor or controller, the computer readable medium comprising:
    program instructions that set a voltage instruction and current-controlling the motor according to the voltage instruction while rotating a motor by using a rotation device capable of transferring a rotation force to the motor;
    program instructions that obtain a d-axis current and a q-axis current, which are feedback currents, during the current-control of the motor;

program instructions that determine when a state is a steady state in which the d-axis current and the q-axis current are constant within a set range; and program instructions that calculate a resolver offset ($\tilde{\theta}$) from the d-axis current and the q-axis current by using $\tilde{\theta}=\tan^-$(d-axis current/q-axis current) when a normal state determination is made, wherein after the d-axis current and the q-axis current are obtained in a state where the motor is rotated by a rotation device, the voltage instruction is calculated from the obtained d-axis current and q-axis current based on the following equations:

$$V_d = -\omega(L_1+L_2)i_q - Ki_d$$

$$V_q = \omega(L_1+L_2)i_d - Ki_q \quad \text{(E1)},$$

wherein $V_d$ represents a d-axis voltage instruction, $V_q$ represents a q-axis voltage instruction, $\omega$ represents a motor rotator angular velocity, $L_1$ and $L_2$ represent inductance constants, $i_d$ represents a d-axis current, $i_q$ represents a q-axis current, and K represents a control constant.

7. The non-transitory computer readable medium of claim 6, wherein the program instructions that calculate of the resolver offset ($\tilde{\theta}$) the d-axis current and the q-axis current are an average value of d-axis currents ($i_d$) and an average value of q-axis currents ($i_q$) obtained at set sampling time intervals, and the resolver offset ($\tilde{\theta}$) is calculated by:

$$\tilde{\theta} = -\tan^{-1}\left(\frac{\overline{i_d}}{\overline{i_q}}\right), \quad \text{(E2)}$$

wherein $\overline{i_d}$ represents an average value for the d-axis current and $\overline{i_q}$ represents an average value for the q-axis current.

8. The non-transitory computer readable medium of claim 6, wherein the d-axis current and the q-axis current are obtained by performing coordinate-conversion on current on the motor measured by a current sensor using a resolver detection value.

9. The non-transitory computer readable medium of claim 6, wherein in a hybrid vehicle, the rotation device is an engine.

10. The non-transitory computer readable medium of claim 6, wherein the motor is a traction motor for vehicle driving.

11. The non-transitory computer readable medium of claim 6, wherein in a hybrid vehicle, the motor is an integrated starter and generator (ISG).

12. A system comprising:
a motor,
a rotation device connected to the motor selectively via clutch; and
a controller configured to set a voltage instruction and current-controlling the motor according to the voltage instruction while rotating a motor by using a rotation device capable of transferring a rotation force to the motor, obtain a d-axis current and a q-axis current, which are feedback currents, during the current-control of the motor, determine when a state is a steady state in which the d-axis current and the q-axis current are constant within a set range, and calculate a resolver offset ($\tilde{\theta}$) from the d-axis current and the q-axis current by using $\tilde{\theta}=\tan^-$(d-axis current/q-axis current) when a normal state determination is made, wherein after the d-axis current and the q-axis current are obtained in a state where the motor is rotated by a rotation device, the voltage instruction is calculated from the obtained d-axis current and q-axis current based on the following equations:

$$V_d = -\omega(L_1+L_2)i_q - Ki_d$$

$$V_q = \omega(L_1+L_2)i_d - Ki_q \quad \text{(E1)},$$

wherein $V_d$ represents a d-axis voltage instruction, $V_q$ represents a q-axis voltage instruction, $\omega$ represents a motor rotator angular velocity, $L_1$ and $L_2$ represent inductance constants, $i_d$ represents a d-axis current, $i_q$ represents a q-axis current, and K represents a control constant.

* * * * *